(12) United States Patent
Deisinger et al.

(10) Patent No.: US 10,876,629 B2
(45) Date of Patent: Dec. 29, 2020

(54) BELLOWS HAVING AERATING MEANS

(71) Applicant: GKN Driveline International GmbH, Lohmar (DE)

(72) Inventors: Markus Deisinger, Siegburg (DE); Winfried Busch, Hennef (DE); Ludger Wenning, Neunkirchen-Seelscheid (DE)

(73) Assignee: GKN Driveline International GmbH, Lohmar (DE)

( * ) Notice: Subject to any disclaimer, the term of this patent is extended or adjusted under 35 U.S.C. 154(b) by 162 days.

(21) Appl. No.: 16/082,036

(22) PCT Filed: Mar. 28, 2017

(86) PCT No.: PCT/EP2017/057320
§ 371 (c)(1),
(2) Date: Sep. 4, 2018

(87) PCT Pub. No.: WO2017/167757
PCT Pub. Date: Oct. 5, 2017

(65) Prior Publication Data
US 2020/0173555 A1 Jun. 4, 2020

(30) Foreign Application Priority Data
Mar. 31, 2016 (DE) .......................... 10 2016 105 901

(51) Int. Cl.
*F16J 3/04* (2006.01)
*F16D 3/84* (2006.01)
*F16D 3/223* (2011.01)

(52) U.S. Cl.
CPC .............. *F16J 3/046* (2013.01); *F16D 3/845* (2013.01); *F16J 3/042* (2013.01); *F16D 2003/22316* (2013.01); *F16D 2003/846* (2013.01)

(58) Field of Classification Search
CPC ..... F16D 2003/846; F16D 3/845; F16J 3/042; F16J 3/046
See application file for complete search history.

(56) References Cited

U.S. PATENT DOCUMENTS 4,556,400 A * 12/1985 Krude ....................... F16D 3/84
277/636
5,308,284 A 5/1994 Renzo
(Continued)

FOREIGN PATENT DOCUMENTS

| DE | 10058172 A1 | 5/2002 |
|---|---|---|
| DE | 10 2005 006884 A1 | 9/2006 |

(Continued)

OTHER PUBLICATIONS

International Search Report and Written Opinion for PCT/EP2017/057320 dated Jun. 26, 2017 (12 pages; with English translation).

*Primary Examiner* — Nicholas L Foster
(74) *Attorney, Agent, or Firm* — Bejin Bieneman PLC

(57) ABSTRACT

A boot is provided in which the formation of an internal pressure inside the boot during assembly is prevented. The boot has a first fastening region and a first diameter and having a second fastening region with a second diameter, wherein the first diameter is smaller than the second diameter, and wherein the first fastening region comprises a binder seat region on its outer circumference, wherein at an inner circumference of the first fastening region at least one first and at least one second aerating means are arranged axially spaced from each other at the inner circumference which is formed with a flat surface, and protrude beyond said surface of the inner circumference.

14 Claims, 3 Drawing Sheets

(56) References Cited

U.S. PATENT DOCUMENTS

| | | | | |
|---|---|---|---|---|
| 6,203,024 | B1* | 3/2001 | Liebich | B62D 7/20 277/559 |
| 6,921,091 | B2* | 7/2005 | Neviani | F16D 3/845 277/634 |
| 8,096,889 | B2* | 1/2012 | Deisinger | F16J 3/042 277/635 |
| 2004/0036231 | A1* | 2/2004 | Neviani | F16D 3/845 277/634 |
| 2005/0179216 | A1* | 8/2005 | Neviani | F16D 3/845 277/634 |
| 2008/0070706 | A1 | 3/2008 | Compau | |
| 2010/0219590 | A1 | 9/2010 | Watanabe | |
| 2011/0159971 | A1* | 6/2011 | Deisinger | F16J 3/042 464/175 |

FOREIGN PATENT DOCUMENTS

| | | |
|---|---|---|
| DE | 602004001084 T2 | 12/2006 |
| GB | 2296946 A | 7/1996 |
| GB | 2296946 B | 7/1996 |
| JP | H06129537 A | 5/1994 |
| KR | 2011 0060563 A | 6/2011 |

\* cited by examiner

BELLOWS HAVING AERATING MEANS

CROSS-REFERENCE TO RELATED APPLICATIONS

This application is a national stage of, and claims priority to, Patent Cooperation Treaty Application No. PCT/EP2017/057320, filed on Mar. 28, 2017, which application claims priority to German Application No. DE 10 2016 105 901.3, filed on Mar. 31, 2016, which applications are hereby incorporated herein by reference in their entireties.

BACKGROUND

Boots designed for example as folding bellows or as rolling bellows are used for sealing an arrangement of a first machine part, disposed at a second machine part. Examples for such arrangements are for example joints, in particular constant velocity joints in automobiles. Such boots are for example used for sealing constant velocity plunging joints or fixed joints. However, other areas of use apart from the automotive industry are also known.

Upon mounting boots on machine parts, an overpressure may be generated inside the boot. This in particular exerts a negative influence on the sealing effect of the boot used, which may also be caused by fatigue cracks and may lead to an early failure of the boot. This is especially relevant in cases where a boot is already preassembled with its second fastening region having the second, larger diameter, on a second machine part, and only afterwards, the first machine part is attached to the second machine part. In this case, the first machine part has to be pushed through the opening of the boot at said first fastening region, facing the first machine part, into the preassembled boot.

If a boot generates an overpressure inside, its sealing effect is reduced in particular as the grease inside the boot, being provided for lubrication but also for noise reduction, can escape. Such overpressure might also cause an incorrect positioning of the first machine part, or an insufficiently firm and dense attachment of said first fastening region to the first machine part by means of a fastening means as for example a compression ring or a clamping strap. This in particular causes problems in case of using thermoplastic elastomers as material for a boot, as such boots compared to boots made of rubber materials has negative effects on the sealing properties due to different material properties and a higher rigidity. This is especially relevant for fastening regions of boots having a smaller diameter.

SUMMARY

Disclosed herein is a boot and a method for attaching a boot, which prevents generating overpressure inside the boot, in particular upon mounting the boot onto a shaft, and at the same time provides a good sealing effect after fastening. The present disclosure thus relates to a boot comprising a first fastening region having a first diameter and a second fastening region having a second diameter, wherein the first diameter is smaller than the second diameter, and wherein said first fastening region comprises a binder seat region on its outer circumference, as well as a method for attaching such boot and its use for the sealing of shafts. The boot can have, at the inner circumference of said first fastening region, at least one first and at least one second aerating means arranged, being axially spaced from each other arranged at the inner circumference which is formed with a flat surface, and protruding beyond the surface of the inner circumference of said first fastening region.

An exemplary boot has a middle section between said first fastening region and said second fastening region, which can in case of, for example, a folding bellows, be addressed as folding region, or it may be formed as for a rolling boot. In this case, between the middle section and said first fastening region, a conical projection can be disposed, which is useful for rolling boots, e.g., for a design not having a folding region with more than one fold. The boot can be formed as a rolling boot.

Said first fastening region having the first, smaller diameter can, for example, be assigned to a shaft of a joint arrangement, and said second fastening region having the second, larger diameter, can be assigned to a joint casing. The boot with said second fastening region is then attached to the outer part of the joint casing of the joint arrangement. An exemplary boot can be disposed at constant velocity plunging joints and fixed joints. Said first and said second diameter of said first and said second fastening region are arranged accordingly.

The first binder seat region at the outer circumference of said fastening region is defined by providing a circumferential outer surface of the boot, in which a binder, for example, in the form of a clamping strap or compression ring, can be arranged, in a way that the boot is attached to a first machine part as, for example, a shaft. There is at least a surface beneath said binder. It can be confined by at least a first and at least a second positioning means, which can be formed differently.

Said positioning means can for example be designed as circumferential beads that are arranged axially displaced facing each other in pairs at the outer circumference of said first fastening region, in a way that said first binder seat region is formed between them. In this case, exactly one first and one second positioning means would be provided. Said at least one first and at least one second position means can however also be designed in a way that they are formed as ear-shaped protrusions at the outer circumference of said first fastening region of said first binder seat, being axially spaced, and can face each other in pairs, wherein said first and said second positioning means form a pair. In such kind of embodiment, for example, more than one first and second positioning means are arranged at the outer circumference of said first fastening region, for example, as above described facing each other in pairs, for example at least three, four, five, six, seven, eight or more of each of said first and second positioning means. Further, combinations of the designs of said at least one first and at least one second position means, as above described, are possible.

Said second positioning means may for example be designed as a circumferential bead, or said second positioning means may be a circumferential annular wall, formed through a material thickening in the middle section or within the conical projection of the boot, wherein in case of the last mentioned embodiment, in particular ear-shaped second position means are arranged in the region of the wall at the outer circumference of said first fastening region, whereas first positioning means can be formed as ear-shaped protrusions. However, a reverse or any other combined design is also possible. For example, said first binder seat region has, particularly in case of providing at least one first and at least one second position means between them, a flat form in said first fastening region, which means that its surface has no depressions and elevations. It may however also be provided that said binder seat region has one or more circumferential grooves which are arranged adjacently and axially displaced.

Said second fastening region arranged at the second, larger diameter of the boot according to the invention also has a second binder seat region, which is defined by first and second positioning means being arranged there. These first and/or second positioning means may be designed as explained above concerning said first and second positioning means of said first binder seat region in said first fastening region. For example such positioning means of said second binder seat region can be formed as ear-shaped protrusions, for example facing each other in pairs, wherein a first and a second positioning means form a pair, that can be axially displaced. Said second binder seat region itself can have a flat form, which means not having any elevations and depressions, for example however, it can have at least one, for example at least two, circumferential grooves, axially displaced, arranged in said second binder seat region.

Said at least one first and said at least one second aerating means can face each other in pairs, which means they are arranged in a spaced manner on an axis running coaxially to a central axis of the boot, arranged on the surface of the inner circumference of said first fastening region. Here, a first and a second aerating means form a pair. This means that if only one first and only one second aerating means are provided in said first fastening region, they can nevertheless form a pair, if they are assigned to one another, e.g., facing each other. An essential feature of forming a pair is that an area is formed between said first and said second aerating means, via which an overpressure, which might be generated while the boot is mounted, can escape from the interior of the boot. For example, such area for pressure escape is also provided on both sides of said at least one first and said at least one second aerating means. An area formed between said at least one first and said at least one second aerating means which in case of a displaced arrangement of said at least one first and said at least one second aerating means, which may also be an arrangement in pairs, may be angularly displaced to a central axis of the boot, is preferably formed flatly, which means that it has a surface without any elevations or depressions. Especially for example, this area has at least no elevation, which protrudes beyond a height of said at least one first and said at least one second aerating means, determined based on the surface of the inner circumference of said first fastening region.

Especially for example, at least three first and at least three second, further for example, at least four, at least five, at least six, at least seven, at least eight, at least nine or more first and second aerating means are provided, and can be further arranged uniformly on the surface of the inner circumference of said first fastening region, even further for example as described above in pairs assigned to one another, e.g., facing each other in pairs, which means they are arranged in a spaced manner on an axis running coaxially to a central axis of the boot.

Due to the fact that said at least one first and at least one second aerating means are protruding beyond the surface of the inner circumference of said first fastening region, a free space is formed between them while the boot is mounted on a first machine part, for example a shaft, said free space forming a passage opening together with the area around said at least one first and said at least one second aerating means, through which air can escape, which avoids generating an overpressure in the boot, more precisely in the system formed by a boot assembled of a first and a second machine part, said system possibly further comprising a grease filling inside the boot. In the event of such pressure offset, possibly, due to the provision of a passage opening, excess grease can also escape.

The above-described assembly does not comprise a closure via a fastening means. Thus, relating to said fastening means as far as already preassembled but not closed, or relating to the unattached arrangement of the boot onto a shaft, this part of the assembly can be referred to as an open position. Especially advantageous is the arrangement of said at least one first and said at least one second aerating means, if the boot is in a preassembled manner already attached to said second machine part and said first machine part is pushed through the opening in the region of said first fastening region of the boot to be disposed at said second machine part. This is usually accompanied by a widening, in particular a radial widening running around the complete circumference of said first fastening region, in a way that a pressure is generated in the region between the outer circumference of said first machine part and said first fastening region, which does however not have the effect that the surface of the inner circumference of said first fastening region conforms to the surface of said first machine part and thus already leads to a tight sealing. Because by providing said at least one first and said at least one second aerating means, this exactly is avoided at least in a certain area of said first fastening region at its inner circumference, such that at least in that area for example air and/or grease can escape, which offsets a possibly generated pressure inside the boot.

Moving said fastening means into a closed position respectively into a fastening position of the boot onto a first machine part, in particular a shaft, causes a displacement of the material of said first fastening region and/or first binder seat region into the region between said at least one first and said at least one second aerating means, which leads to a closing of the opening formed there. This reliably prevents grease of a grease filling from escaping after assembly, including attaching the boot onto a first machine part, has been completed.

The space between at least one first and at least one second aerating means, arranged in a coaxially spaced or, where appropriate even angular manner, based on a central axis of the boot at the inner circumference of said first fastening region is chosen such that after attaching the boot on a first machine part, in particular a shaft, a material displacement or material accumulation in an area between said at least one first and said at least one second aerating means is generated, which in particular prevents grease from escaping from an interior of the boot and/or causes a tight abutting of said first fastening region on a surface of said first machine part. A constant aerating situation is thus avoided which due to an inevitably associated connection between the inside and the outside of the boot supports leaking grease. A surface of said first machine part is flat which means that it is formed in particular without a depression like a circumferential groove or the like, or it has only a shallow depression, particularly a shallow circumferential groove.

For example, in a plan view of the inner circumference of said first fastening region, said at least one first and/or said at least one second aerating means has an approximately elliptical shape. This plan view is made approximately perpendicular based on the surface of the inner circumference of said first fastening region. Said at least one first and/or at least one second aerating means does not need to have exactly an elliptical shape. Its form can rather be different as far as it has basically a main axis and a minor axis corresponding to an ellipse. Said at least one first and/or at least one second aerating means has basically an elongated form. For example, a main axis of said at least one first and/or said at least one second aerating means is formed approximately coaxially to a central axis of the boot. In particular a deviation of up to about +/−20°, further for example about +/−10° from a coaxial arrangement is possible and according to the present disclosure comprised by the expression "approximately coaxially".

Seen in a cross section, said at least one first and/or at least one second aerating means has an approximately convex form. This convex form especially refers to the transition from the surface of the inner circumference of said first fastening region on both sides of said at least one first and/or at least one second aerating means having a convex curvature. In a middle section between these two convex curvature sections, said at least one first and/or at least one second aerating means can be formed flatly or curved, as well. In case of a flat form, the middle section is formed approximately parallel to the surface of the inner circumference of said first fastening region of the boot in its unattached state. Within the transition area of the convex curvature of said at least one first and/or at least one second aerating means, a curvature region having a concave curvature can be arranged for achieving the smoothest possible transition from the surface of the inner circumference of said first fastening region. Instead of being addressed as elliptically shaped, said at least one first and/or at least one second aerating means may also be addressed as ellipsoidally convex or as being formed lens-like. The afore-mentioned terms are comprised according to the invention by the expression "approximately elliptical shape".

Said at least one first and/or one second aerating means is formed in a way that during mounting the boot onto a first machine part, a passage opening is provided, through which air and/or grease can escape from an interior of the boot during the assembly. Moreover, said at least one first and/or at least one second aerating means is advantageously formed such that it does not impede a sufficient sealing effect in the area of said first fastening region after assembly of the boot on a first machine part has been completed. It may also be provided that said at least one first and/or at least one second aerating means will wear out during use which will even improve the sealing effect.

In an example embodiment, said at least one first and/or at least one second aerating means is formed integrally with said first fastening region. For example, all first and/or second aerating means can be designed integrally with said first fastening region. The material of the boot according to the invention and thus also the material of said first fastening region and of said at least one first and said at least one second aerating means is selected from a group comprising thermoplastic elastomer materials (TPE) and is particularly selected from a group comprising thermoplastic ester-ether-elastomers (TEEE). But for example thermoplastic vulcanizates (TPV) or thermoplastic olefines and polychloroprenes can also be used.

For example, said at least one first and/or said at least one second aerating means can be arranged at least partly beneath said at least one first and/or said at least one second positioning means on the surface of the inner circumference of said first fastening region. For example, said at least one first as well as said at least one second aerating means can be arranged beneath said at least one first and said at least one second positioning means on the surface of the inner circumference of said first fastening region. Due to the arrangement, a relatively large distance between said at least one first and said at least one second fastening means can be obtained, in a way that they do not prevent a sufficient sealing effect after the assembly of the boot on the first machine part has been completed. Through attachment by means of a fastening means, in particular a compression ring or clamping strap, a complete sealing can be obtained. In this way, preferably between said at least one first and said at least one second positioning means, after attachment by means of the fastening means, a region having a bead-like material displacement is formed at the inner circumference of said first fastening region, the surface of which being in contact with the surface of said first machine part in a circumferential groove being advantageously provided there. In case of providing more than one first and second aerating means, the material displacement can also be formed as a circumferential ring bead. This provides for a sufficient sealing effect.

Said first and/or second positioning means each have an outer side face and an inner side face as well as possibly arranged between them an upper surface. A positioning underneath said first and/or second positioning means formed in such way means that said at least one first and/or at least one second aerating means is arranged at least beneath the inner side faces, further for example also beneath at least a part of the upper surface of said first and/or second positioning means. The upper surface of said first and/or second positioning means is in this case for example formed essentially parallel to a surface of said first binder seat region. An arrangement of said at least one first and/or at least one second aerating means can also be made completely underneath said at least one first and said at least one second positioning means. However, this is not required. For example, an at least partial arrangement of the said at least one first and/or at least one second aerating means beneath said at least one first and at least one second positioning means may be sufficient. It generally depends on the function, that an adequate spacing is achieved between said at least one first and said at least one second aerating means in order to form a sufficient sealing in the area between them after having completed the assembly of the boot by attaching it with a fastening means on a first machine part.

For example, a surface of said first binder seat region can be formed approximately parallel to the surface of the inner circumference of said first fastening region. Further for example, the surface of said first binder seat region as well as the surface of the inner circumference of said first fastening region can be flat, which means without any elevations and/or depressions, except for said at least one first and/or at least one second aerating means. In case of the mentioned embodiments, a reliable sealing effect can be obtained when the assembly of the boot on the first machine part has been completed, wherein at the same time a passage opening can be provided during assembly, in particular before or while arranging and closing said fastening means.

Furthermore, the present disclosure relates to a method for attaching An exemplary boot as defined above on a first machine part, in particular a shaft, wherein attaching said first fastening region having the first diameter, on said first machine part by means of a fastening means is realized in a way that while attaching the fastening means, especially by applying a pressure exerted by it onto said first fastening region, at least in subareas between the surface of the inner circumference of said first fastening region and a surface of said first machine part, a passage opening is provided. For example, said first fastening region can be widened for arranging said first machine part at a second machine part, further for example in the form of a widening extending beyond the complete circumference of said first fastening region. In an alternative method for attaching the boot, the boot is attached to a first machine part, in particular a shaft, wherein said first fastening region is widened for arranging the first machine part at a second machine part, further for example also in the form of a widening extending beyond the complete circumference of said first fastening region, in a way that at least in subareas between the surface of the inner circumference of said first fastening region and a surface of said first machine part, a passage opening is provided. Due to the elastic properties of the materials used for the boot, after widening said first fastening region, for example beyond the complete circumference of said first fastening region, it will return into its initial position before the widening, such that a kind of preassembly of the boot with said first fastening region on the first machine part is given.

With the presently-disclosed method, said first fastening region of the boot according to the invention can be arranged in the area of a circumferential groove which may have a shallow form, onto said first machine part, for example a shaft. However, such groove must not necessarily be given. After the widening, in case of the alternative method, said fastening means, especially a compression ring or a clamping strap, can be disposed in said first binder seat region, which the boot is finally fastened with. This causes a closing of the passage opening respectively passage openings and between said at least one first and said at least one second aerating means, an area of a circumferential material displacement is formed, which can have the shape of a circumferential ring bead respectively a material accumulation and thus generates a sufficient sealing effect.

In an example embodiment, before attachment to said first machine part, the boot can be attached with said second fastening region having the second, larger diameter, to a second machine part, for example an outer part of a joint housing. Especially in case of such constellations, an overpressure inside the boot can be generated when said first machine part is arranged at said second machine part, which is prevented by providing said at least one first and/or at least one second aerating means.

In a further example embodiment, an area of a bead-like material displacement or material accumulation is formed when said first fastening region is attached between said axially spaced first and second aerating means by means of fastening means, the surface of such material displacement or material accumulation being in contact with the surface of said first machine part. If only one pair of first and second aerating means, preferably arranged in pairs facing each other and axially displaced, is present, in the area between them, a bead-like deformation is formed upon attaching the boot with said first fastening region by means of a fastening means onto said first machine part, the bead-like deformation being not circumferential. This also provides a sufficient sealing. If a plurality of, for example, such kind of pairs of first and second aerating means are arranged at said first fastening region, the material displacement is formed as a circumferential ring bead.

Finally, the present disclosure relates to the use of An exemplary boot as defined above, for sealing shafts, in particular joint shafts, especially for constant velocity plunging joints and fixed joints. A joint arrangement can comprise an exemplary boot and a constant velocity plunging joint or fixed joint. The joint arrangement further for example comprises a first fastening means to attach said first fastening region of the boot, especially a rolling bellow, to a shaft as the first machine part, and a second fastening means to attach said second fastening region of the boot onto a joint casing as the second machine part. In the fastening position or closed position, a material displacement or material accumulation is generated in said first fastening region between said at least one first and said at least one second aerating means, the surface of which interacts with a surface of the shaft and provides a sealing, which prevents grease from escaping from the interior of the boot.

DESCRIPTION

Figure 1:
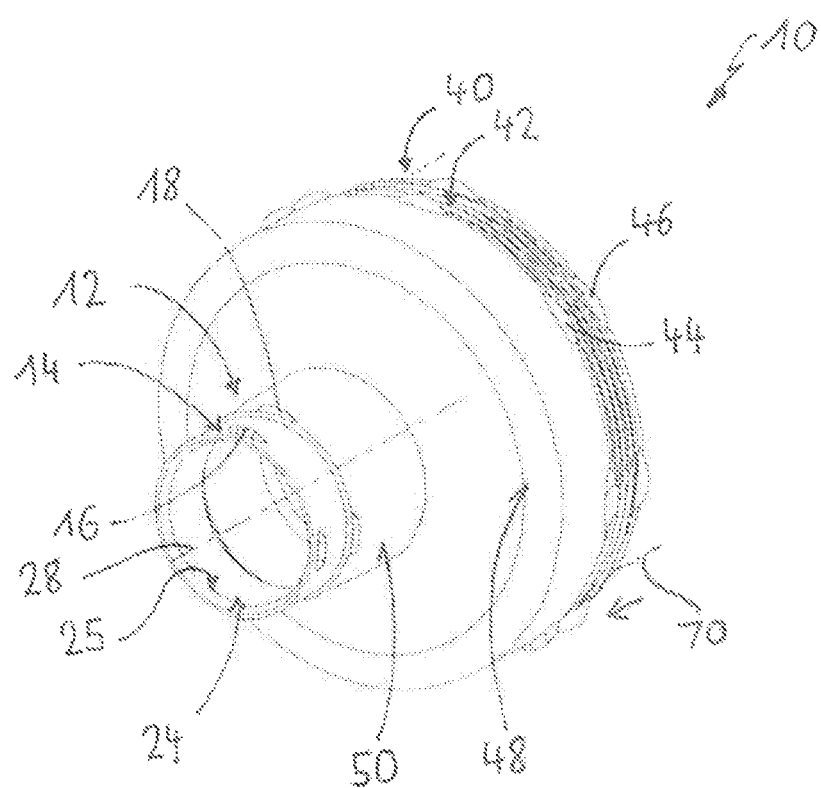
FIG. 1: a perspective view of an example boot with an example second machine part being attached to the boot.

FIG. 1 shows in a perspective view a boot 10 having a first fastening region 12 with a first binder seat region 14 and a second fastening region 40 with a second binder seat region 42, wherein the second fastening region 40 has a significantly larger second diameter than the first diameter of the first fastening region 12. Between the first and the second fastening region 12, 40 a middle section 48 is arranged. This can for example be shaped as for a rolling bellow according to the embodiment in FIG. 1, but also for example like a folding bellow, if the boot is formed as a folding bellow. In case of the embodiment of the boot 10 according to FIG. 1, furthermore, a conical projection 50 tapering in the direction of the first fastening region 12, is arranged.

The first binder seat region 14 has ear-shaped first positioning means 16 and second positioning means 18, being arranged in pairs facing each other and axially displaced at the outer circumference of the first fastening region 12. Between them, the binder seat region 14 is formed, having a flat surface without any elevations and depressions.

The second binder seat region 42 is defined by first and second positioning means 44 and 46, being shaped similarly to the first fastening region 12, as ear-shaped protrusions in pairs facing each other and axially displaced. Here, the binder seat region 42 has a plurality of circumferential annular grooves, such that its surface is not shaped flatly at its outer circumference, as compared to the first binder seat region 14.

Figure 2:
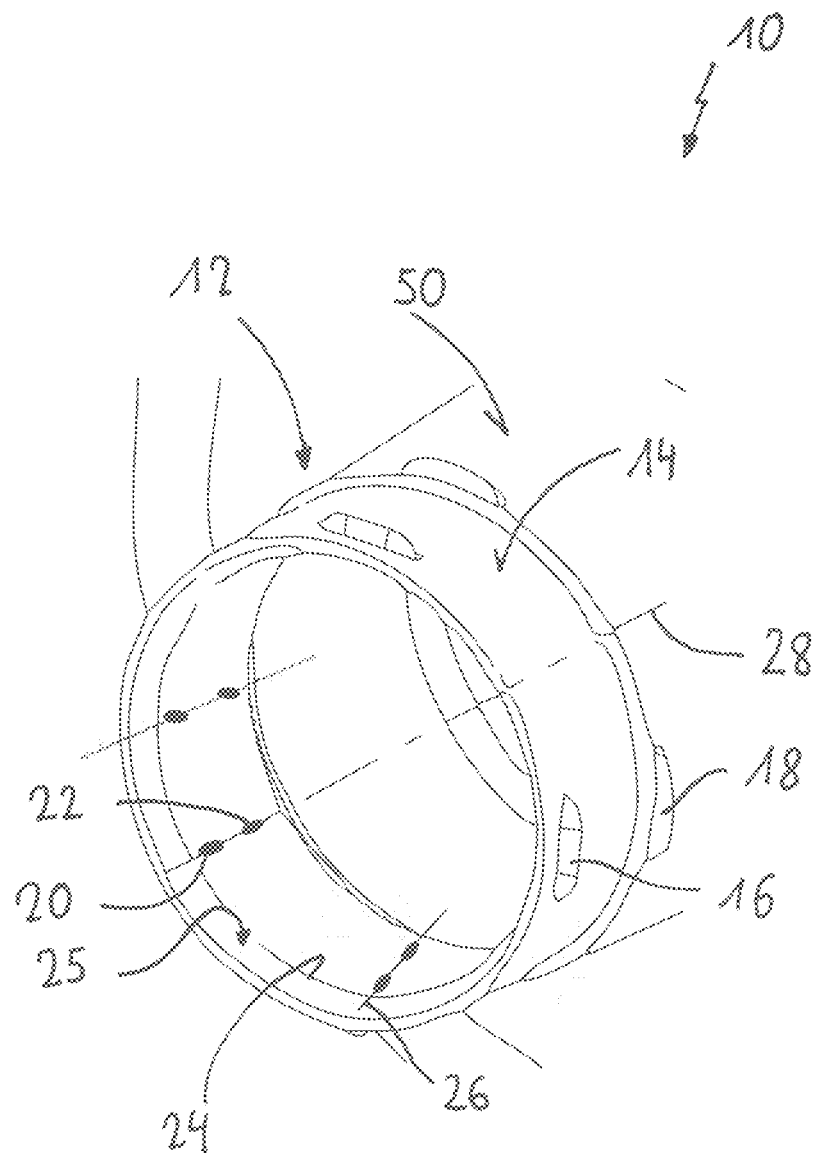
FIG. 2: an enlarged perspective view of a first fastening region of the boot according to FIG. 1.

FIG. 2 shows in an enlarged view the embodiment of the first fastening region 12 of the boot 10 according to FIG. 1. Here, in particular the arrangement of the second positioning means 18 in the area of a wall can be seen, which is formed by a material thickening in the conical projection 50. Moreover, the first and second aerating means 20, 22 arranged on a surface 24 at an inner circumference 25 can be seen, which are arranged in pairs facing each other and axially spaced from each other. In a plan view, they have an approximately elliptical shape. A main axis 26, passing through the first and second aerating means 20 respectively 22, is aligned coaxially to a central axis 28 (see FIG. 1) of the boot 10.

Figure 3:
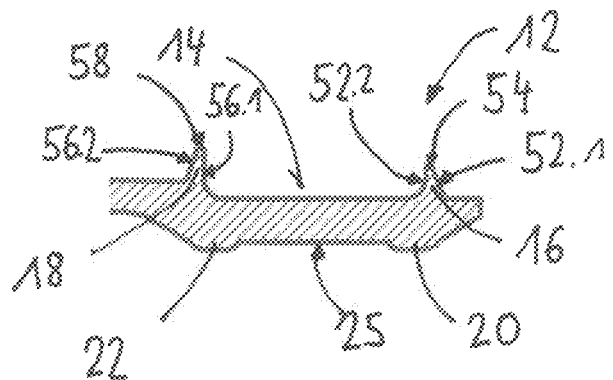
FIG. 3: a cross section through the first binder seat region of an embodiment of the boot having a first and a second aerating means arranged in pairs facing each other, in the unassembled state.

The exact arrangement of the first and the second aerating means 20 respectively 22 can be seen easily in the cross-sectional view according to FIG. 3. The first aerating means 20 as well as the second aerating means 22 has a convex form as seen in a cross-sectional view. Both are protruding beyond the surface 25 of the inner circumference 24. In a middle section between them they are shaped flatly. The surface of the middle section is formed approximately parallel to the surface 25 of the inner circumference 24 respectively the surface of the first binder seat region 14.

The first aerating means 20 is partly arranged beneath the first positioning means 16. It is in particular disposed beneath an inner side face 52.2 and at least partly beneath a surface 54 of the first positioning means 16, which furthermore has an outer side face 52.1. The second aerating means 22 is partly arranged beneath the second positioning means 18 in the area of an inner side face 56.1 and at least partly beneath an upper surface 58 of it. The second positioning means furthermore has an outer side face 56.2.

Figure 4:
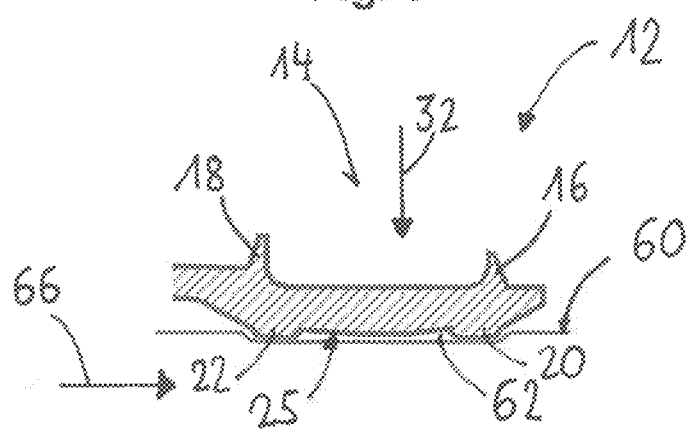
FIG. 4: a sectional view according to FIG. 3 of a boot arranged on a first machine part after widening.

FIG. 4 shows an example embodiment of the boot, especially one being already attached to a second machine part 70 via the second fastening region 40, in a cross-sectional view through the first fastening region 12 after widening caused by passing through of a first machine part having an upper surface 60. This state can also be described as preassembled state. Between the first aerating means 20 and the second aerating means 22, a part of a passage opening 62 is formed, which extends before and behind the first and second aerating means 20 respectively 22 further to the inner and outer end of the first fastening region 12. In this state, air but also grease can escape from an interior of the boot in the direction of an arrow 66. Due to the elastic properties of the material for the boot 10, pressure is applied in the direction of an arrow 32, in a way that the boot 10 which is preassembled on the first machine part, is retained in a flat annual bead there provided.

Figure 5:
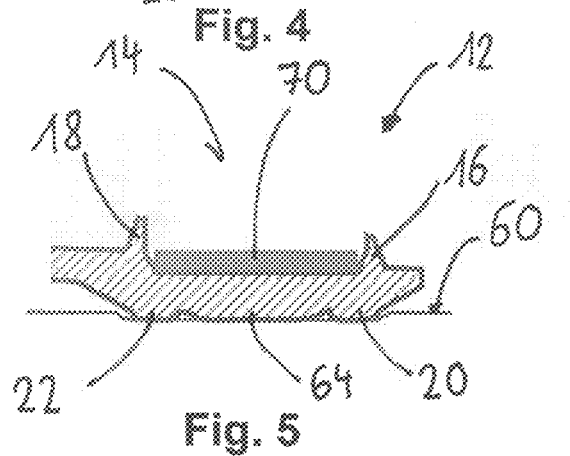
FIG. 5: a sectional view according to FIG. 3 showing the boot firmly attached to the first machine part by means of a fastening means.

FIG. 5 shows a finish-mounted state of the first fastening region 12 according to FIGS. 3 and 4, after attachment of a fastening means 70, for example a compression ring, in the first binder seat region 14. In this way, material of the first binder seat region 14 is displaced between the first aerating means 20 and the second aerating means 22 in the form of a bead-like material displacement 64, in a way that a surface of the bead 64 comes into contact with the surface 60 of the first machine part. This generates a sufficient sealing effect of the boot 10 on the first machine part.

The features shown in the figures are not limited to these specific embodiments. Rather, each of them can be combined with those features indicated in the description including the description of the figures and drawings, in order to obtain further embodiments. The boot can for example also be designed as a folding bellow. The same also applies with regard to the design of the first fastening region 12 and of the second fastening region 14 including the first and second positioning means 16, 18 respectively 42 and 46, being provided there. The same furthermore applies with regard to the design of the surface of the first binder seat region 14 and of the second binder seat region 42. Finally, the same also applies with regard to the design and arrangement of the first and second aerating means 20 respectively 22, which may for example also have another form, or which can be arranged in a larger or in a lesser number and not only in pairs facing each other, but also displaced to one another, may be axially displaced on the surface 25 of the inner circumference 24 of the first fastening region 12. Corresponding aerating means can for example also be arranged in the second fastening region 40 at the inner circumference of it.

The present disclosure advantageously provides a boot by means of which the generating of an internal pressure during the mounting of the boot onto a first and a second machine part is prevented, and which after assembly provides a sufficient sealing effect, which prevents grease of the boot's grease filling from escaping. This is especially advantageous in cases where the boot has already been assembled on a second machine part with its large diameter with its second fastening region, such that subsequently, the first machine part has to be pushed through the small opening at the small diameter in the first fastening region of the boot.

The invention claimed is:

1. A boot, comprising:
   a first fastening region having a first diameter and a second fastening region having a second diameter;
   wherein the first diameter is smaller than the second diameter;
   wherein the first fastening region comprises a binder seat region on its outer circumference;
   wherein at an inner circumference of the first fastening region at least one first and at least one second aerating protrusions are arranged axially spaced from each other at a flat surface of the inner circumference, and protrude beyond the flat surface of the inner circumference; and
   wherein the flat surface of the inner circumference of the first fastening region includes a flat region axially between the at least one first and at least one second aerating protrusions, wherein the flat region has a sufficiently long axial width that the flat region is formable to have a bead-like material displacement against a surface of a first machine part when the first fastening region is fastened by fastening means between the axially spaced first and second aerating protrusions.

2. The boot of claim 1, wherein the at least one first and the at least one second aerating protrusions are arranged facing each other in at least one pair on the flat surface of the inner circumference of the first fastening region.

3. The boot of claim 1, wherein at least three first and at least three second aerating protrusions are provided, and are arranged uniformly on the flat surface of the inner circumference of the first fastening region.

4. The boot of claim 1, wherein the first or the second aerating protrusions have an approximately elliptical shape according to a plan view.

5. The boot of claim 4, wherein the boot has an annular shape defining a central axis, and a main axis of the one of the first or second aerating protrusions having an approximately elliptical shape is aligned in an approximately coaxial manner relative to the central axis of the boot.

6. The boot of claim 1, wherein the at least one first or the at least one second aerating protrusions are integral with the first fastening region.

7. The boot of claim 1, wherein the at least one first or the at least one second aerating protrusions are arranged at least partly below at least one first or at least one second ear-shaped protrusions on the flat surface of the inner circumference of the first fastening region.

8. The boot of claim 1, wherein one surface of the first binder seat region is formed approximately parallel to the flat surface of the inner circumference of the first fastening region.

9. A method for attaching a boot to a first machine part, wherein the boot includes a first fastening region having a first diameter and a second fastening region having a second diameter; wherein the first diameter is smaller than the second diameter;

wherein the first fastening region comprises a binder seat region on its outer circumference; and wherein at an inner circumference of the first fastening region at least one first and at least one second aerating protrusions are arranged axially spaced from each other at a flat surface of the inner circumference, and protrude beyond the flat surface of the inner circumference; the method comprising:

attaching the first fastening region having the first diameter on the first machine part by means of a fastening means such that, while disposing the fastening means at least in subareas between the flat surface of the inner circumference of the first fastening region and a surface of the first machine part, a passage opening is provided;

wherein, through fastening the first fastening region by means of the fastening means between the axially spaced first and second aerating protrusions, a region having a bead-like material displacement is formed, which is in contact with the surface of the first machine part.

10. The method of claim 9, wherein the first fastening region is widened for arranging the first machine part therein.

11. The method of claim 9, wherein the first fastening region is widened for disposing the first machine part therein, such that the passage opening is provided at least in subareas between the flat surface of the inner circumference of the first fastening region and a surface of the first machine part.

12. The method of claim 9, further comprising, before attaching the boot to the first machine part, attaching the boot with its second fastening region having the second, larger diameter to a second machine part.

13. The method of claim 9, wherein the first machine part is a joint shaft.

14. A boot assembly, comprising:
a first machine part having a first surface;
a boot including a first fastening region having a first diameter and a second fastening region having a second diameter; and
fastening means;
wherein the first diameter is smaller than the second diameter;
wherein the first fastening region comprises a binder seat region on its outer circumference; and
wherein at an inner circumference of the first fastening region, at least one first and at least one second aerating protrusions are arranged axially spaced from each other at a flat surface of the inner circumference, and protrude beyond the flat surface of the inner circumference;
wherein the fastening means fasten the first fastening region between the axially spaced first and second aerating protrusions, forming a region having a bead-like material displacement that is in contact with the surface of the first machine part.

* * * * *